United States Patent
Woolverton et al.

(10) Patent No.: US 11,377,948 B2
(45) Date of Patent: Jul. 5, 2022

(54) REMOVABLE REAL TIME CLOCK BATTERY ASSEMBLY

(71) Applicant: Oliden Technology, LLC, Stafford, TX (US)

(72) Inventors: Stephen Woolverton, Houston, TX (US); Ting Lau, Houston, TX (US); Zhichao Gong, Richmond, TX (US); Philippe Hui, Stafford, TX (US); Qiming Li, Sugar Land, TX (US)

(73) Assignee: Oliden Technology, LLC, Stafford, TX (US)

( * ) Notice: Subject to any disclaimer, the term of this patent is extended or adjusted under 35 U.S.C. 154(b) by 111 days.

(21) Appl. No.: 17/066,143

(22) Filed: Oct. 8, 2020

(65) Prior Publication Data
US 2022/0112800 A1 Apr. 14, 2022

(51) Int. Cl.
*E21B 47/017* (2012.01)
*E21B 33/12* (2006.01)
*E21B 23/00* (2006.01)

(52) U.S. Cl.
CPC ............ *E21B 47/017* (2020.05); *E21B 23/00* (2013.01); *E21B 33/12* (2013.01)

(58) Field of Classification Search
CPC ......... E21B 47/017; E21B 23/00; E21B 33/12
See application file for complete search history.

(56) References Cited

U.S. PATENT DOCUMENTS

| | | | | | |
|---|---|---|---|---|---|
| 4,476,894 | A | * | 10/1984 | Alder | F16K 37/0041 175/40 |
| 4,663,628 | A | * | 5/1987 | Duncan | E21B 47/26 700/74 |
| 5,329,811 | A | * | 7/1994 | Schultz | E21B 49/081 73/152.28 |
| 6,610,441 | B2 | * | 8/2003 | Hensley | H01M 10/0468 429/174 |
| 6,705,406 | B2 | | 3/2004 | Das | |
| 9,366,092 | B2 | * | 6/2016 | Hutin | E21B 17/028 |
| 2003/0183384 | A1 | * | 10/2003 | Das | E21B 47/01 166/250.11 |
| 2004/0246059 | A1 | * | 12/2004 | Varsamis | E21B 47/017 331/176 |

(Continued)

OTHER PUBLICATIONS

PCTUS2153202—Written Opionion, 2022.*
PCTUS2153202—ISR, 2022.*

*Primary Examiner* — Steven A Macdonald
(74) *Attorney, Agent, or Firm* — Bryan L. White

(57) ABSTRACT

A removable real time clock battery ("RRTCB") assembly is disclosed herein. The RRTCB assembly has an outer housing removably mounted in a port of a downhole tool. The outer housing is adapted to receive at least a portion of an inner housing. The inner housing has a cavity therein and is mounted in the port of the downhole tool. The inner housing is removably disposed within the outer housing. A real time clock battery is removably disposed in the cavity of the inner housing. The real time clock battery electrically connects to a clock disposed within the downhole tool. The RRTCB assembly can be readily removed from the downhole tool or bottomhole assembly (while at the earth's surface) without otherwise disassembling the downhole tool. The real time clock battery can then be removed and replaced or installed if not present.

34 Claims, 5 Drawing Sheets

(56) References Cited

U.S. PATENT DOCUMENTS

2015/0260030 A1* 9/2015 Wisinger, Jr. ........... E21B 41/00
                                                        702/89
2016/0299253 A1* 10/2016 Zhang .................... G01V 99/00
2019/0078431 A1*  3/2019 Castrero ................. E21B 10/36

* cited by examiner

| Provide a downhole tool or a sub in a bottomhole assembly on which a removable real time clock battery assembly is mounted, the removable real time clock battery assembly comprising: an outer housing removably mounted in a port of the downhole tool or the sub in the bottomhole assembly; an inner housing having a cavity therein and mounted in the port of the downhole tool or the sub in the bottomhole assembly, the outer housing being adapted to receive at least a portion of the inner housing, the said portion of the inner housing being releasably disposed within the outer housing; and a real time clock battery removably disposed in the cavity of the inner housing and electrically connected only to a clock disposed within the downhole tool or the sub in the bottomhole assembly. |——502

| Remove the outer housing from the downhole tool or the sub in the bottomhole assembly without otherwise disassembling the downhole tool or the sub in the bottomhole assembly. |——504

| Remove the real time clock battery. |——506

| Dispose a second real time clock battery in the inner housing. |——508

| Establish an electrical connection between the second real time clock battery and the clock. |——510

| Mount the outer housing to the downhole tool or the sub in the bottomhole assembly. |——512

Figure 5

REMOVABLE REAL TIME CLOCK BATTERY ASSEMBLY

CROSS-REFERENCE TO RELATED APPLICATIONS

N/A

BACKGROUND OF THE DISCLOSURE

In the oil and gas industry, Measurement While Drilling (MWD) and Logging While Drilling (LWD) tools are often used during drilling operations to obtain measurements of one or more subsurface parameters. The downhole measurement and logging tools are generally connected in series to form an interconnected suite of tools known as a bottomhole assembly. Those downhole tools often comprise electrical and sensor systems to acquire, process, and transmit downhole data, as well as receive and process data sent from the surface; thus, electrical power is generally required to operate those tools. MWD/LWD tools are generally powered while operating downhole using battery systems in conjunction with drilling-fluid-driven turbine systems, which provide intermittent power to the electrical boards and sensors (i.e., while drilling fluid is being pumped). Those electrical power sources are typically mounted to or housed within the interior regions of drill collars.

A real time clock (RTC), which may be disposed, for example, in a stand-alone electrical board system, an integrated circuit, a microcontroller, or other equipment, is used to provide accurate timekeeping and timing measurements, and is necessary for proper operation of other electrical systems. If the electrical and sensor systems lose correct timing, measured quantities (e.g., depth, orientation, voltage, etc.) may not be properly correlated, significantly hindering proper and useful data gathering and creating problems regarding data analysis. Smaller battery systems, known as real time clock batteries, are used in the oil and gas industry to provide power to RTC timers and devices to keep accurate track of time while downhole, regardless of electrical power availability or unavailability from other sources.

The electronics and sensors of LWD/MWD tools are generally packaged, mounted, and sealed so as to protect them from the harsh drilling environment, which may include drilling and formation fluids, caustic chemicals, particulates, high pressures, high temperatures, and high vibrational and shock loads. This typically necessitates a method of packaging that, once assembled, is very difficult and costly to remove, and potentially damaging to other components. Generally, a real time clock battery is embedded with the electronics and is not accessible after the tool is assembled.

However, various factors necessitate periodic maintenance and removal of real time clock batteries. For example, if during storage or through use an RTC battery loses its charge, maintenance must be performed to replace it. Currently, once an RTC battery is installed, it will discharge even while the tool is in storage, thereby shortening (if not exhausting) the useful lifetime of the battery. The remaining life (i.e., amount of charge) of a pre-installed RTC battery can only be estimated by relying on installation/maintenance records and making assumptions regarding power consumption by the tool. In addition, RTC batteries have different temperature ratings, with high-temperature rated batteries (e.g., ≥180° C.) typically having much less power and shorter lifetimes. Running a job in a high temperature well generally requires replacing a factory-installed low-temperature rated RTC battery with a high-temperature version. However, replacing a RTC battery in many of the LWD/MWD tools means that the tool has to be disassembled, which is very time consuming, and damage may occur inadvertently as a result of such an operation.

Further, a downhole capable RTC battery is typically made using lithium ion technology, which brings into play hazardous substance shipping requirements. When shipping a tool to a location, the RTC battery often must be removed and stored in a special shipping container. As stated above, for RTC batteries located within an interior electrical system, removing or re-installing an RTC battery often means fully disassembling the tool, which can be costly, time-intensive, and risky to components.

SUMMARY

A removable real time clock battery ("RRTCB") assembly is disclosed herein. The RRTCB assembly has an outer housing removably mounted in a port of a downhole tool. The outer housing is adapted to receive at least a portion of an inner housing. The inner housing has a cavity therein and is mounted in the port of the downhole tool. The inner housing is removably disposed within the outer housing. A real time clock battery is removably disposed in the cavity of the inner housing. The real time clock battery electrically connects to a clock disposed within the downhole tool. The RRTCB assembly can be readily removed from the downhole tool or bottomhole assembly (while at the earth's surface) without otherwise disassembling the downhole tool. The real time clock battery can then be removed and replaced or installed if not present.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read in conjunction with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

FIG. 5 is a flowchart describing steps for the removal and/or installation of the removable real time clock battery assembly of FIG. 1, in accordance with the present disclosure.

DETAILED DESCRIPTION

Figure 1:
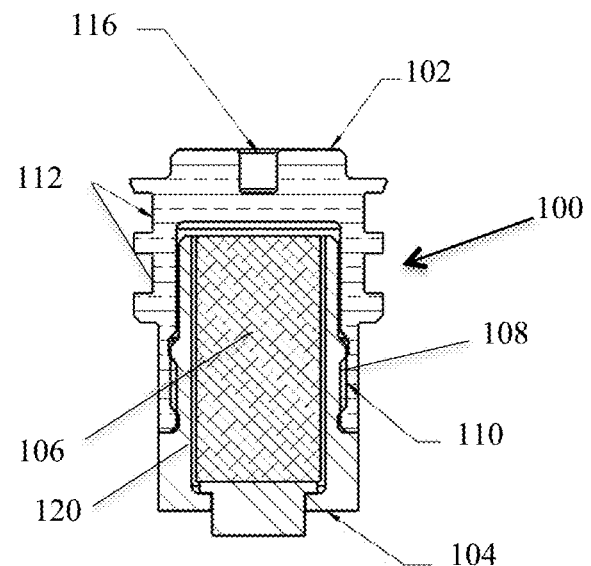
FIG. 1 is a cross-sectional, schematic drawing of one embodiment of a removable real time clock battery assembly, in accordance with the present disclosure.

It is to be understood that the following disclosure provides multiple embodiments or examples for implementing different features of the various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, but may also include embodiments in which additional features may be formed interposed between the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by those terms. Those terms are only used to distinguish one element from another.

The terminology used in the description herein is for the purpose of describing particular embodiments only and is not intended to be limiting. As used in the description and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]", depending on the context.

Designing a removable real time clock ("RTC") battery assembly presents many challenges, such as space availability, high-temperature (e.g., ≥125° C.) operating requirements, and high-pressure sealing. Other important design considerations are ruggedness, low cost, and ease of maintenance. An apparatus and method to provide a removable RTC battery assembly is disclosed herein. The removable RTC battery assembly can be installed, for example, onto a drill collar after the electronics chassis has been installed, provides a high-pressure seal, and protects the RTC battery from downhole conditions. The removable RTC battery assembly is compact, easy to maintain, rugged, and removable without disassembling any other part of the tool. It can be mounted, for example, on the exterior of a downhole tool or sub of a bottomhole assembly, while not compromising the safety or integrity of the packaged electrical and sensor systems internal to the downhole tool or bottomhole assembly components. Mounting the removable RTC battery assembly separately from the electronics and sensors of any underlying component allows the RTC battery to be installed and/or replaced at a well site, if necessary, say, due to the RTC battery in the tool unexpectedly dying. That eliminates the need for guesswork about battery life prior to running a tool, as the battery can now be installed at the manufacturing facility just prior to any job or as a standard maintenance or troubleshooting action. Additionally, the RTC battery itself can be tailored to the specific job requirements by matching run-time needs and expected operating temperatures to the correct battery since battery capacity or life is significantly reduced for batteries rated at or above 165° C.

A removable RTC battery assembly can have one or more batteries disposed therein. The removable RTC battery assembly provides pressure protection, fluid sealing, ease of removal and installation, as well as protection against shocks and vibrations and other drilling conditions for the batteries disposed therein. The embodiment of FIG. 1 shows a removable RTC battery assembly 100 having an outer housing 102 and an inner housing 104. An RTC battery 106 is disposed within the interior of inner housing 104. Inner housing 104 has a connecting feature 108 (such as a threaded connection) that is removeably joined to outer housing 102 via a complementary connecting feature 110 on outer housing 102.

Figure 2:
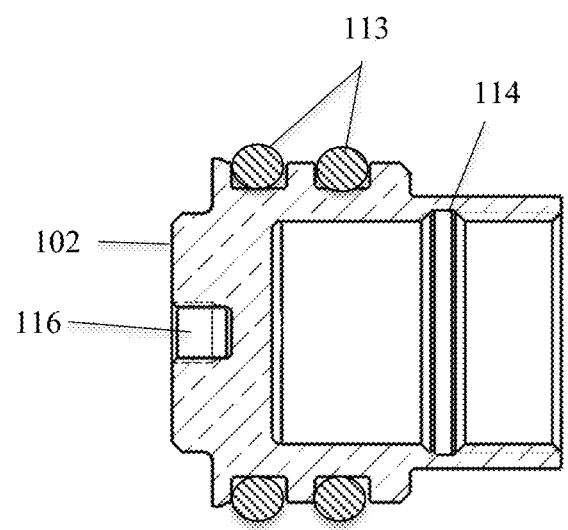
FIG. 2 is a cross-sectional, schematic drawing of one embodiment of an outer housing of the removable real time clock battery assembly of FIG. 1, in accordance with the present disclosure.

FIG. 2 shows the outer housing 102 of FIG. 1. The outer housing 102 in this embodiment is a one-piece component having a grooved seat 112 (see FIG. 1) to provide a means for sealing, such as O-rings and/or back-up rings, to prevent incursion of fluids from the wellbore annulus into the RTC battery assembly. For example, elastomeric O-rings 113 made from materials such as a fluoropolymer elastomer (e.g., VITON), silicone, or hydrogenated nitrile butadiene rubber (HNBR) can be installed in the outer housing groove seats 112 to provide sealing against pressure and chemical incursion. Outer housing 102 further comprises an alignment aid 114, which aids in the installation and retention of inner housing 104. Outer housing 102 may optionally have a threaded recess 116 to allow the assembly to be pulled out as a removable maintenance plug.

Figure 3:
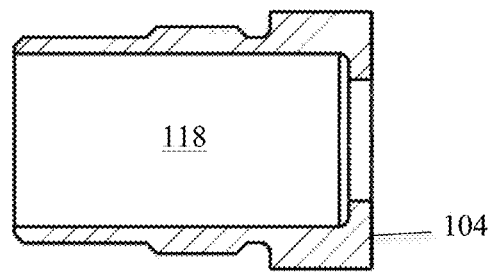
FIG. 3 is a cross-sectional, schematic drawing of one embodiment of an inner housing of the removable real time clock battery assembly of FIG. 1, in accordance with the present disclosure.

FIG. 3 shows the inner housing 104 of FIG. 1. The inner housing 104 in this embodiment is a one-piece component made of a dielectric material having high-temperature capability. Inner housing 104 holds RTC battery 106 in cavity 118 and insulates it from nearby charged or metallic components. Depending on application and temperature requirements, the dielectric material may be a thermoplastic resin such as polyether ether ketone (PEEK) or a fiberglass composite. Any excess space around RTC battery 106 can be filled with a vibration and temperature resistant potting compound 120 such as silicone rubber (e.g., room-temperature-vulcanizing (RTV) silicone), thermoplastic resin, or epoxy resin.

Figure 4:
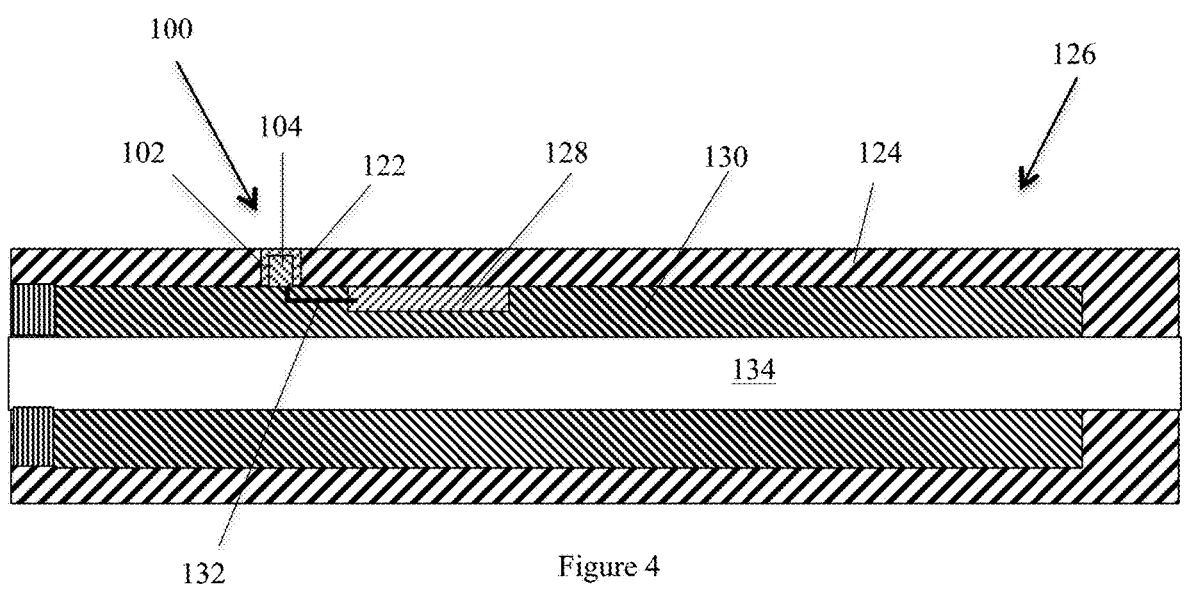
FIG. 4 is a cross-sectional, schematic drawing of one embodiment of the removable real time clock battery assembly of FIG. 1 mounted onto a downhole tool, in accordance with the present disclosure.

FIG. 4 shows the embodiment of the removable real time clock battery assembly 100 of FIG. 1 mounted in a small port 122 in the drill collar 124 of the downhole tool 126. The port 122 has a minimal footprint and virtually no impact on the strength and operational aspects of collar 124. Inner housing 104 may be fixedly mounted in port 122 or removably mounted therein. Outer housing 102 is removably mounted in port 122 and encases inner housing 104 and RTC battery 106 (FIG. 1). Such a mounting scheme requires only one radially machined feature (i.e., through the collar wall) and does not require any exposed fasteners on the outer surface of collar 124. A controller or printed circuit board 128 is disposed on a chassis 130 in downhole tool 126. Board 128 has timekeeping circuitry (not shown) referred to herein as a real time clock. Real time clock battery 106 is electronically connected to the real time clock, for example, using wire 132. Passageway 134 is the passageway through which drilling fluids (e.g., "mud") are pumped.

RTC battery 106 electrically connects to the real time clock, but does not electrically connect to any other circuitry on board 128. Thus, only the RTC is powered by the RTC battery 106. Multiple methods can be used to electrically connect the RTC battery 106 to the RTC of the downhole tool or bottomhole component. For example, this can be done through direct wire-to-wire connections 132 via splicing or crimping, using mating connectors and contacts (not shown), or with specialized circuit boards (not shown). In particular, however, the RTC battery 106 is connected only to the real time clock within the downhole tool or bottomhole component.

FIG. 5 shows a flowchart illustrating an embodiment in accordance with this disclosure. In this embodiment, the workflow comprises:

Step 502—Provide a downhole tool or a sub in a bottomhole assembly on which a removable real time clock battery assembly is mounted, the removable real time clock battery assembly comprising: an outer housing removably mounted in a port of the downhole tool or the sub in the bottomhole assembly; an inner housing having a cavity therein and mounted in the port of the downhole tool or the sub in the bottomhole assembly, the outer housing being adapted to receive at least a portion of the inner housing, the said portion of the inner housing being releasably disposed within the outer housing; and a real time clock battery removably disposed in the cavity of the inner housing and electrically connected only to a clock disposed within the downhole tool or the sub in the bottomhole assembly;

Step 504—Remove the outer housing from the downhole tool or the sub in the bottomhole assembly without otherwise disassembling the downhole tool or the sub in the bottomhole assembly;

Step 506—Remove the real time clock battery;
Step 508—Dispose a second real time clock battery in the inner housing;
Step 510—Establish an electrical connection between the second real time clock battery and the clock; and
Step 512—Mount the outer housing to the downhole tool or the sub in the bottomhole assembly.

Figure 6:
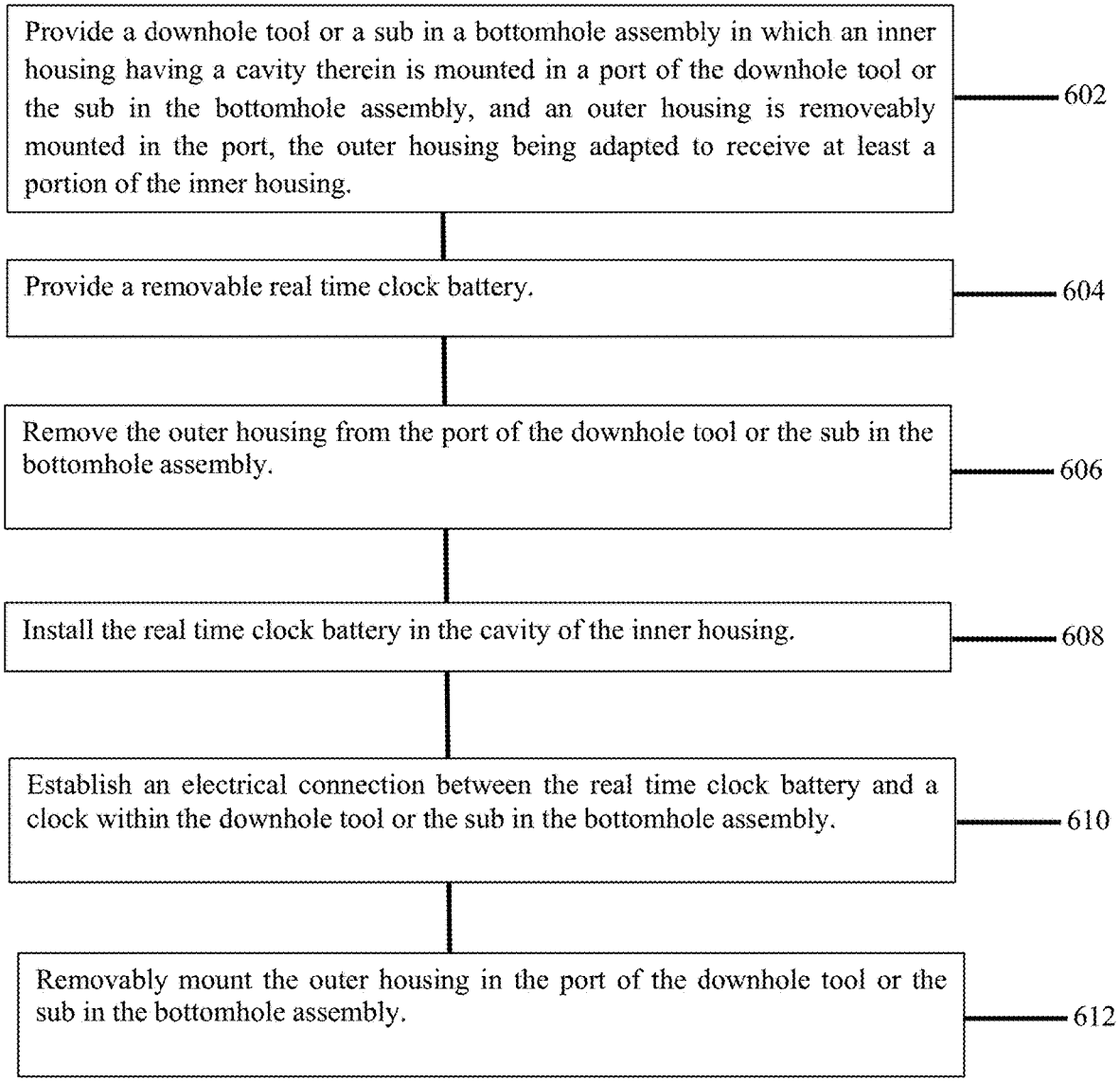
FIG. 6 is a flowchart describing steps for first installing a real time clock battery somewhere other than a manufacturing facility, in accordance with this disclosure

FIG. 6 shows a flowchart illustrating an alternative embodiment in accordance with this disclosure in which a real time clock battery is first installed somewhere other than the manufacturing facility (e.g., the well site). In this embodiment, the workflow comprises:

Step 602—Provide a downhole tool or a sub in a bottomhole assembly in which an inner housing having a cavity therein is mounted in a port of the downhole tool or the sub in the bottomhole assembly, and an outer housing is removably mounted in the port, the outer housing being adapted to receive at least a portion of the inner housing;

Step 604—Provide a removable real time clock battery;
Step 606—Remove the outer housing from the port of the downhole tool or the sub in the bottomhole assembly
Step 608—Install the real time clock battery in the cavity of the inner housing;
Step 610—Establish an electrical connection between the real time clock battery and a clock within the downhole tool or the sub in the bottomhole assembly; and
Step 612—Removably mount the outer housing in the port of the downhole tool or the sub in the bottomhole assembly.

Figure 7:
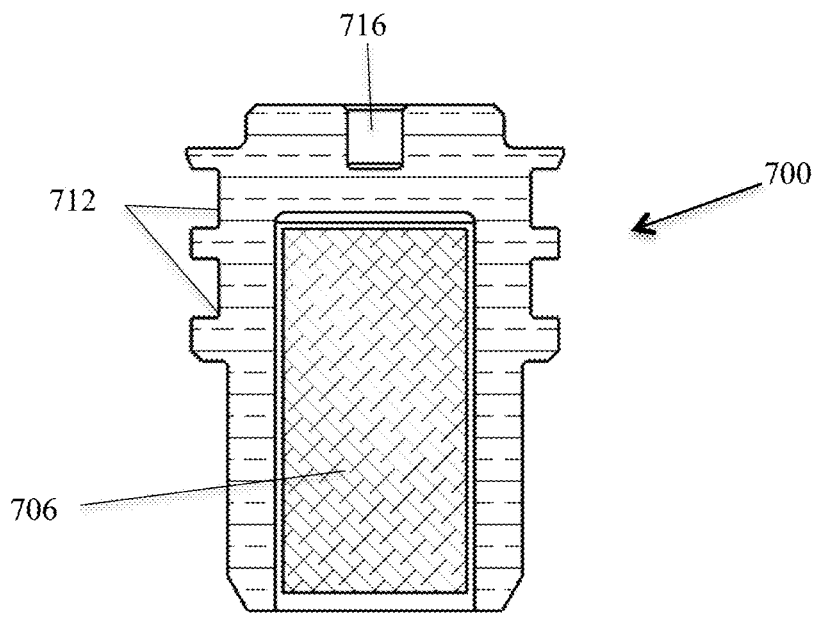
FIG. 7 is a cross-sectional, schematic drawing of a further embodiment of a removable real time clock battery assembly, in accordance with the present disclosure.

A further embodiment of a removable RTC battery assembly is shown in FIG. 7.

The RTC battery assembly 700 has many characteristics in common with RTC battery assembly 100, but, in particular, does not have an inner housing. Instead, the RTC battery 706 is housed directly within a cavity in housing 702. Housing 702 is a one-piece component having a grooved seat 712 to provide a means for sealing, such as O-rings and/or back-up rings, to prevent incursion of fluids from the wellbore annulus into the RTC battery assembly. For example, elastomeric O-rings 113 (see FIG. 2) made from materials such as a fluoropolymer elastomer (e.g., VITON), silicone, or hydrogenated nitrile butadiene rubber (HNBR) can be installed in the outer housing groove seats 712 to provide sealing against pressure and chemical incursion. Housing 702 may optionally have a threaded recess 716 to allow the assembly to be pulled out as a removable maintenance plug.

Similar to the RTC battery assembly 100, the removable RTC battery assembly 700 can be mounted in a small port 122 in the drill collar 124 of the downhole tool 126 (see FIG. 4). Likewise, RTC battery 706 can be electrically connected to a real time clock, but does not electrically connect to any other circuitry on the downhole tool 126. Thus, only the RTC is powered by the RTC battery 706.

Figure 8:
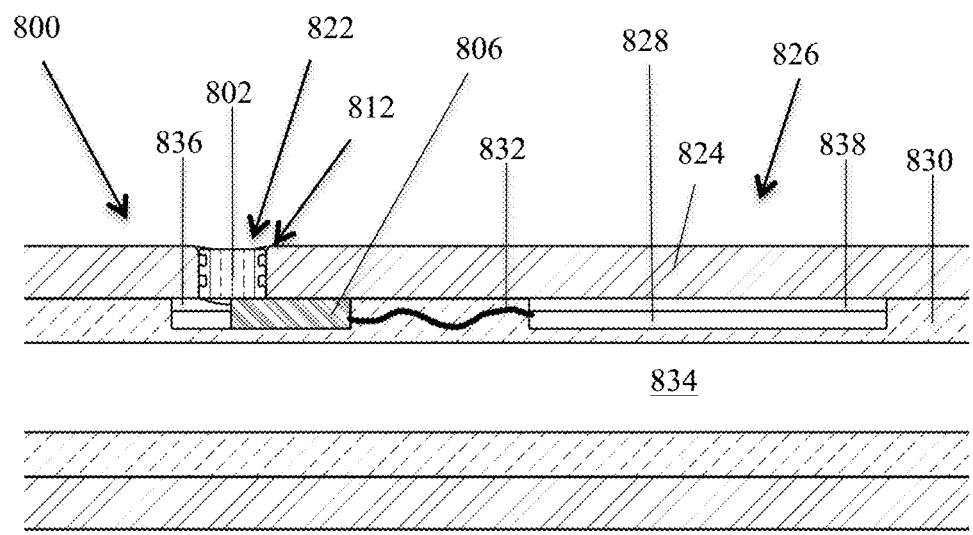
FIG. 8 is a cross-sectional, schematic drawing of a further embodiment of a removable real time clock battery assembly mounted onto a downhole tool, in accordance with the present disclosure.

A further embodiment of a removable RTC battery assembly is shown in FIG. 8. Removable RTC battery assembly 800 is mounted in a downhole tool 826. A chassis 830 is disposed in an interior passageway 834 of downhole tool 826. Chassis 830 has two cavities 836, 838 formed on its outer surface. One cavity 836 is adapted to house a RTC battery 806 and the other cavity 838 is adapted to house electronic circuitry 828 that includes a real time clock (not shown). Chassis 830 is generally sealed at its ends (not shown) to prevent fluid incursion into the cavities 836, 838. RTC battery 806 is removably disposed in cavity 836 and may be secured therein by various means, e.g., a spring. RTC battery 806 is electronically connected only to the real time clock, for example, using wire 832. A plug 802 is mounted in a small port 822 in a drill collar 824 of the downhole tool 826. Plug 802 has sealing surfaces 812 in which sealing elements (not shown) such as the O-rings 113 of FIG. 2 may be disposed. Plug 802 similarly may have a threaded recess (not shown) in its outer surface to aid in the removal of plug 802. Once plug 802 is removed, one has ready access to cavity 836 to insert or replace RTC battery 806.

Steps similar to those shown in the flowcharts of FIGS. 5 and 6, modified accordingly, may be executed using the embodiments of FIGS. 7 and 8.

Throughout this detailed description and in the original claims, the inventors have repeatedly stated the RTC battery is electronically connected only to the real time clock. This distinguishes the present invention from other, typically larger, electric power supplies currently used on downhole tools to power multiple downhole electrical components that generally make relatively heavy power demands on such power supplies. To be clear, the inventors intend the above limitation to mean there are no significant electrical (i.e., electronic) demands placed on the RTC battery by electronic components other than the real time clock. However, any device that electronically connects to the RTC battery that consumes a small amount of electrical power relative to the real time clock is to be considered within the scope of the present invention. For example, a high resistance shunt that diverts a small fraction of the total RTC battery current and thereby consumes a relatively small amount of the RTC battery's power is considered to be an attempted design-around within the scope of this disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intent of the applicant not to invoke 35 U.S.C. § 112(f) for any limitations of any of the claims herein, except for those in which the claim expressly uses the words 'means for' together with an associated function.

What is claimed is:

1. An apparatus, comprising:
    a housing removably mounted in a port of a downhole tool or a sub in a bottomhole assembly, the housing having a cavity; and
    a real time clock battery removably disposed in the cavity of the housing;
    wherein the real time clock battery electrically connects only to a clock disposed within the downhole tool or the sub in the bottomhole assembly.

2. The apparatus of claim 1, further comprising a vibration and temperature resistant potting compound disposed in the cavity of the housing between the real time clock battery and the housing.

3. The apparatus of claim 1, further comprising a sealing element disposed in a sealing seat formed in the housing.

4. The apparatus of claim 1, wherein the housing further comprises a threaded recess to aid removal of the housing from the downhole tool or the sub in the bottomhole assembly.

5. A method, comprising:
    providing a downhole tool or a sub in a bottomhole assembly on which a removable real time clock battery assembly is mounted, the removable real time clock battery assembly comprising: a housing removably mounted in a port of the downhole tool or the sub in a bottomhole assembly, the housing having a cavity; and a real time clock battery removably disposed in the cavity of the housing and electrically connected only to a clock disposed within the downhole tool or the sub in the bottomhole assembly;
    removing the housing from the downhole tool or the sub in the bottomhole assembly without otherwise disassembling the downhole tool or the sub in the bottomhole assembly;
    removing the real time clock battery from the housing cavity;
    disposing a second real time clock battery in the housing cavity;
    establishing an electrical connection between the second real time clock battery and the clock; and
    mounting the housing with the second real time clock battery in the cavity of the housing in the port of the downhole tool or the sub in the bottomhole assembly.

6. The method of claim 5, further comprising selecting the second real time clock battery based on run-time needs and/or expected operating temperatures.

7. The method of claim 5, further comprising providing protective elements to protect against wellbore pressures, fluid incursion, and/or shocks and vibrations.

8. A method, comprising:
    providing a downhole tool or a sub in a bottomhole assembly in which a housing is removably mounted in a port of the downhole tool or the sub in the bottomhole assembly, the housing having a cavity;
    providing a removable real time clock battery;
    removing the housing from the port of the downhole tool or the sub in the bottomhole assembly;
    installing the real time clock battery in the cavity of the housing;

establishing an electrical connection between the real time clock battery and a clock within the downhole tool or the sub in the bottomhole assembly; and removably mounting the housing with the real time clock battery in the cavity of the housing in the port of the downhole tool or the sub in the bottomhole assembly.

9. The method of claim 8, further comprising selecting the real time clock battery based on run-time needs and/or expected operating temperatures.

10. The method of claim 8, further comprising providing protective elements to protect against wellbore pressures, fluid incursion, and/or shocks and vibrations.

11. An apparatus, comprising:
an outer housing removably mounted in a port of a downhole tool or a sub in a bottomhole assembly;
an inner housing having a cavity therein and mounted in the port of the downhole tool or the sub in the bottomhole assembly, the outer housing being adapted to receive at least a portion of the inner housing, the said portion of the inner housing being releasably disposed within the outer housing; and
a real time clock battery removably disposed in the cavity of the inner housing;
wherein the real time clock battery electrically connects only to a clock disposed within the downhole tool or the sub in the bottomhole assembly.

12. The apparatus of claim 11, wherein the inner housing is made of a dielectric material.

13. The apparatus of claim 11, further comprising a vibration and temperature resistant potting compound disposed in the cavity of the inner housing between the real time clock battery and the inner housing.

14. The apparatus of claim 11, further comprising a sealing element disposed in a sealing seat formed in the outer housing.

15. The apparatus of claim 11, wherein the outer housing has a first alignment structural element complementary to a second alignment structural element on the inner housing.

16. The apparatus of claim 11, wherein the outer housing further comprises a threaded recess to aid removal of the outer housing from the downhole tool or the sub in the bottomhole assembly.

17. A method, comprising:
providing a downhole tool or a sub in a bottomhole assembly on which a removable real time clock battery assembly is mounted, the removable real time clock battery assembly comprising: an outer housing removably mounted in a port of the downhole tool or the sub in the bottomhole assembly; an inner housing having a cavity therein and mounted in the port of the downhole tool or the sub in the bottomhole assembly, the outer housing being adapted to receive at least a portion of the inner housing, the said portion of the inner housing being releasably disposed within the outer housing; and a real time clock battery removably disposed in the cavity of the inner housing and electrically connected only to a clock disposed within the downhole tool or the sub in the bottomhole assembly;
removing the outer housing from the downhole tool or the sub in the bottomhole assembly without otherwise disassembling the downhole tool or the sub in the bottomhole assembly;
removing the real time clock battery;
disposing a second real time clock battery in the inner housing;
establishing an electrical connection between the second real time clock battery and the clock; and
mounting the outer housing to the downhole tool or the sub in the bottomhole assembly.

18. The method of claim 17, further comprising selecting the second real time clock battery based on run-time needs and/or expected operating temperatures.

19. The method of claim 17, further comprising providing protective elements to protect against wellbore pressures, fluid incursion, and/or shocks and vibrations.

20. The method of claim 17, further comprising using a first alignment structural element on the outer housing complementary to a second alignment structural element on the inner housing to align the inner housing with the outer housing.

21. A method, comprising:
providing a downhole tool or a sub in a bottomhole assembly in which an inner housing having a cavity therein is mounted in a port of the downhole tool or the sub in the bottomhole assembly, and an outer housing is removeably mounted in the port, the outer housing being adapted to receive at least a portion of the inner housing;
providing a removable real time clock battery;
removing the outer housing from the port of the downhole tool or the sub in the bottomhole assembly;
installing the real time clock battery in the cavity of the inner housing;
establishing an electrical connection between the real time clock battery and a clock within the downhole tool or the sub in the bottomhole assembly; and
removably mounting the outer housing in the port of the downhole tool or the sub in the bottomhole assembly.

22. The method of claim 21, further comprising selecting the real time clock battery based on run-time needs and/or expected operating temperatures.

23. The method of claim 21, further comprising providing protective elements to protect against wellbore pressures, fluid incursion, and/or shocks and vibrations.

24. The method of claim 21, further comprising using a first alignment structural element on the outer housing complementary to a second alignment structural element on the inner housing to align the inner housing with the outer housing.

25. An apparatus, comprising:
a plug removably mounted in a port of a downhole tool or a sub in a bottomhole assembly;
a chassis disposed in an interior passageway of the downhole tool or the sub in the bottomhole assembly, the chassis having a first cavity and a second cavity, the second cavity having a clock disposed therein; and
a real time clock battery removably disposed in the first cavity of the chassis;
wherein the real time clock battery electrically connects only to the clock.

26. The apparatus of claim 25, further comprising a vibration and temperature resistant potting compound disposed in the first cavity of the chassis between the real time clock battery and the chassis.

27. The apparatus of claim 25, further comprising a sealing element disposed in a sealing seat formed in the plug.

28. The apparatus of claim 25, wherein the plug further comprises a threaded recess to aid removal of the plug from the downhole tool or the sub in the bottomhole assembly.

29. A method, comprising:
providing a downhole tool or a sub in a bottomhole assembly on which a removable real time clock battery assembly is mounted, the removable real time clock battery assembly comprising: a plug removably mounted in a port of the downhole tool or the sub in the bottomhole assembly; a chassis disposed in an interior passageway of the downhole tool or the sub in the bottomhole assembly, the chassis having a first cavity and a second cavity, the second cavity having a clock disposed therein; and a real time clock battery removably disposed in the first cavity of the chassis and electrically connected only to the clock;

removing the plug from the downhole tool or the sub in the bottomhole assembly without otherwise disassembling the downhole tool or the sub in the bottomhole assembly;

removing the real time clock battery from the first cavity of the chassis;

disposing a second real time clock battery in the first cavity of the chassis;

establishing an electrical connection between the second real time clock battery and the clock; and mounting the plug in the port of the downhole tool or the sub in the bottomhole assembly.

30. The method of claim 29, further comprising selecting the second real time clock battery based on run-time needs and/or expected operating temperatures.

31. The method of claim 29, further comprising providing protective elements to protect against wellbore pressures, fluid incursion, and/or shocks and vibrations.

32. A method, comprising:

providing a downhole tool or a sub in a bottomhole assembly having a plug removably mounted in a port of the downhole tool or the sub in the bottomhole assembly;

providing a chassis disposed in an interior passageway of the downhole tool or the sub in the bottomhole assembly, the chassis having a first cavity and a second cavity, the second cavity having a clock disposed therein;

providing a removable real time clock battery;

removing the plug from the port of the downhole tool or the sub in the bottomhole assembly;

installing the real time clock battery in the first cavity of the chassis;

establishing an electrical connection between the real time clock battery and the clock; and removably mounting the plug in the port of the downhole tool or the sub in the bottomhole assembly.

33. The method of claim 32, further comprising selecting the real time clock battery based on run-time needs and/or expected operating temperatures.

34. The method of claim 32, further comprising providing protective elements to protect against wellbore pressures, fluid incursion, and/or shocks and vibrations.

* * * * *